(12) United States Patent
Peuser

(10) Patent No.: US 8,710,696 B2
(45) Date of Patent: Apr. 29, 2014

(54) REDUNDANT PARALLEL OPERATION OF MOTOR VEHICLE ELECTRICAL SYSTEM GENERATORS

(75) Inventor: Thomas Peuser, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 317 days.

(21) Appl. No.: 12/998,507

(22) PCT Filed: Oct. 19, 2009

(86) PCT No.: PCT/EP2009/063662
§ 371 (c)(1),
(2), (4) Date: Jun. 28, 2011

(87) PCT Pub. No.: WO2010/049306
PCT Pub. Date: May 6, 2010

(65) Prior Publication Data
US 2011/0285201 A1 Nov. 24, 2011

(30) Foreign Application Priority Data

Oct. 29, 2008 (DE) .......................... 10 2008 043 251

(51) Int. Cl.
B60L 1/00 (2006.01)
B60L 3/00 (2006.01)
H02G 3/00 (2006.01)

(52) U.S. Cl.
USPC ......................................... 307/10.1; 307/9.1

(58) Field of Classification Search
None
See application file for complete search history.

(56) References Cited

U.S. PATENT DOCUMENTS

2004/0124703 A1* 7/2004 Tani et al. .................... 307/10.1
2006/0122737 A1 6/2006 Tani et al.
2010/0214119 A1* 8/2010 Peuser et al. ............. 340/825.52

FOREIGN PATENT DOCUMENTS

| CN | 1794532 | 6/2006 |
| DE | 10 2006 052 525 | 5/2008 |
| DE | 10 2007 037 355 | 2/2009 |

* cited by examiner

Primary Examiner — Jared Fureman
Assistant Examiner — Aqeel Bukhari
(74) Attorney, Agent, or Firm — Kenyon & Kenyon LLP

(57) ABSTRACT

In a method for controlling a group of at least two electrical generators which supply a motor vehicle electrical system, each individual generator of the group provides a generator workload value, which indicates a workload of the individual generator, to each other one of the group of generators. The workload values represent an absolute value which indicates an actual power which is generated by the individual generator. Alternatively, the workload values represent a relative value, which indicates a ratio of the actual power to a nominal power of the individual generator.

19 Claims, 1 Drawing Sheet

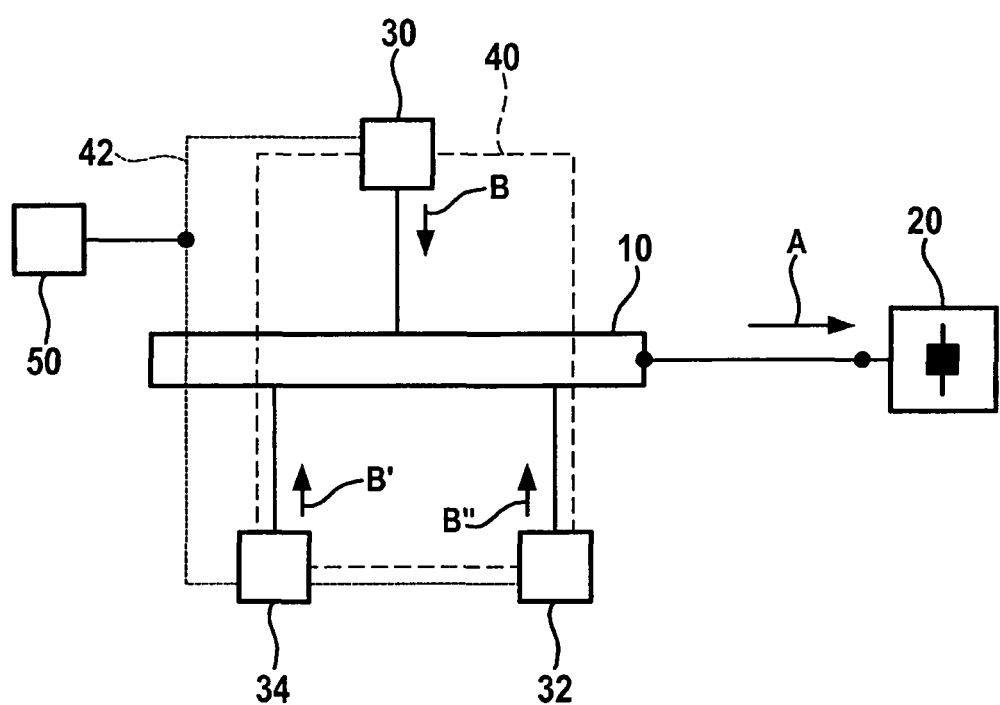

REDUNDANT PARALLEL OPERATION OF MOTOR VEHICLE ELECTRICAL SYSTEM GENERATORS

BACKGROUND OF THE INVENTION

1. Field of the Invention

The present invention relates to control mechanisms for a group of generators which supply a motor vehicle electrical system.

2. Description of Related Art

Most of the known strategies for the symmetrical parallel operation of generators are based on a central control structure having a single regulating master generator or having a central controller and multiple slave generators, which are directly controlled by this central unit. In this case, the master generator or the central controller determines the required workload of the master generator according to a defined strategy and outputs a controlling signal to the slave generators. The slave generators thus receive a specification signal, according to which they are operated, without feedback to the master for the control being provided. The entire regulation intelligence is thus provided in a central unit (in the master generator). In the case of such a system architecture, the total system overview is provided in the master, which activates the slave generators accordingly. The activation strategy of the master is also provided within the master, the slave generators operating according to the specifications output by the master.

For example, published German patent application document DE 10 2007 037 355 A1 describes such a system architecture, in which a central control unit takes over all control tasks and monitoring tasks. The subordinate generators operate according to a benchmark which is output by the central control unit.

However, the disadvantage is inherently linked to the central architecture that all lower-order generators depend on the operation of the central controller or the master generator, so that in case of interference with the central transmission or interference with the central control unit for lack of activation, all lower-order generators also fail. Furthermore, in the case of a high number of lower-order generators, the processing of the particular transmitter signals by the central control unit is complex, so that particularly high requirements with respect to the computing output exist for the central controller. It is therefore an object of the present invention to provide an activation mechanism for a group of generators which does not have these disadvantages or in which the disadvantages are mitigated.

BRIEF SUMMARY OF THE INVENTION

The present invention allows a redundant system for controlling a group of generators, in which a failure of one component does not result in the failure of the total system. The operation of each component therefore does not directly impair the operation of the other components. The function of the total system is not dependent on the function of a single component. A redundant system is provided by the present invention, in which the control tasks are distributed and the correct control of the total system is therefore not dependent on a single component. Therefore, no interference source exists, which may impair the operation of the total system. In addition, the present invention may be provided with components which each have a relatively small computing power, whereby the costs decrease. Furthermore, the present invention allows automatic balancing of the individual generator powers of a group of generators, without complex calculations being required. The controller according to the present invention has a significantly lower susceptibility to failure and allows a displacement of the control tasks to other components if one component fails or if multiple components fail.

The fundamental concept of the present invention is that in the case of controlling multiple, i.e., at least two, electrical generators, which supply the same motor vehicle electrical system, a central entity does not ascertain the particular workload of the generators in a hierarchically higher-order level, but rather each generator ascertains and activates its own workload value itself. For this purpose, each generator receives the individual workload value of each individual generator from each of the other generators, so that each generator of the group, which supplies a common motor vehicle electrical system, transmits corresponding messages to all other generators of the group. It is thus possible that each individual one of the group of generators may ascertain the sum of the powers of the other generators and therefore may relate its own workload or its own power to the powers or the workloads of the other generators. In particular, each individual one of the generators may thus provide its own workload in such a way that its workload does not significantly deviate from the workload of the other generators, the deviation being able to be within a predefined percentage interval, for example, ±50%, ±30%, ±20%, ±10%, or ±5%, for example, of the relative workload of the other generators or their average. In this way, for example, none of the generators is run at a particularly high workload, while substantially lower workloads are applied to the other generators. This decentralized mechanism allows all generators to operate in essentially the same workload range (considered proportionally), so that no single generator is subjected to a substantially higher wear, which is a function of the workload, while other generators are loaded less. In addition, because of the control architecture according to the present invention, all generators have the system overview and may react themselves to events on the basis of their own control mechanisms, for example, to a failure of one of the generators, in that each of the still operating generators additionally takes over the power of the failed generator in proportion to its rated value, for example. In contrast to a central controller according to the related art, upon whose failure none of the generators operates due to a lack of activation, it is obvious that the control architecture according to the present invention provides an N+m redundancy, m being the number of the generators which remain in the case of failure of one or more generators. In other words, by distributing the control intelligence to all generators, an extremely high degree of redundancy is created, so that a failure of one component never results in the failure of the total system, in contrast to centrally controlled architectures, in which the failure of the central controller results in total failure.

Preferably, all generators which are connected to a motor vehicle electrical system are connected according to the present invention and receive messages or signals from each of the other generators which are connected to the motor vehicle electrical system, and also transmit messages to all generators which are connected to the motor vehicle electrical system. Therefore, the controller according to the present invention preferably relates to a group of electrical generators which includes all generators which are connected to the motor vehicle electrical system. According to one embodiment of the present invention, at least two electrical generators are grouped with the controller according to the present invention, the group of at least two electrical generators including all generators which are connected to the motor vehicle electrical system, or including at least two generators which are connected to the motor vehicle electrical system, at least one further generator not being included in the group. The generators of the group generally communicate via a network, the network transmitting messages via a packet-switched or line-switched communication protocol, in general data being transmitted via the network which indicate one generator workload value per generator of the group, which characterizes the workload of the individual generator. The data which the generator workload values transmit are preferably transmitted from one generator to a further generator, or may also be transmitted to a memory within the network, which in turn provides the data so they are retrievable for each of the other generators of the group. The workload values are preferably transmitted in the form of digital data, in particular with the aid of individual digital or binary data packets, which also include an identification of the generator, with which the generator workload value is associated, in addition to the generator workload value. Furthermore, the data packet may include an address identification, which identifies the receiver of the data packet, each individual generator of the group transmitting the data packet to all other generators of the group in that it sends off a data packet, which includes an identification of one of the other generators, for each other generator of the group. The number of the transmitted data packets corresponds to the number of the other generators, each data packet having a different generator identification, so that each other generator receives a data packet which is identified by its identification, i.e., the identification of the transmitting generator.

The workload values are preferably digital values and are therefore rounded by quantification and preferably form a bit word having a fixed word length, for example, a word length of 4 bits, 6 bits, 8 bits, 12 bits, 16 bits, 24 bits, or 32 bits. The transmission may be provided according to a standardized data transmission protocol, so that the individual data packets correspond to the standardization of the data transmission protocol. Data transmission protocols are preferably data transmission protocols for motor vehicle applications, for example, according to the LIN standard or according to the CAN standard. The communication is not necessarily oriented according to the total protocol stack of the particular bus, but rather individual layers of the communication protocol may also be removed from the standard, and other layers may be provided differently from the standard. The communication between the generators preferably runs according to the physical layer, the security layer, and/or the switching layer of the CAN bus protocol or the LAN bus protocol. Furthermore, the data may be provided with redundancy for secure communication, for example, with the aid of an added cyclic redundancy check (CRC). If a standardized protocol is used, the adding of the redundancy may be provided according to the standard, or the useful data themselves may be provided with an additional CRC check. Instead of a CRC check or in combination therewith, the generator workload values may also be provided with redundancy with the aid of convolutional codes, cross total checks, and similar measures. In case of a recognized error, it is either corrected on the basis of the redundancy data or a repeated transmission is requested by a component which recognizes an error (for example, an addressed generator). The data transmission may fundamentally also be provided as a pulse-width-modulated burst, the pulse-width modulation indicating the particular generator workload value and the burst being used so that multiple generators may transmit data via the same network, without the data transmissions overlapping.

The network may be designed as a serial or parallel network, in which digital data are transmitted in serial or parallel, the network topology including a linear bus, a bus loop (open), a star, a tree, a ring-shaped bus, a fully intermeshed network, a partially intermeshed network, or a combination thereof. The individual generators may be directly or indirectly connected to one another. A linear bus which has a beginning and an end, or which is closed per se and is designed as a ring, is preferably used.

The control of the communication may be provided by a central communication unit, for example, an arbiter, which provides a multiplex transmission of the individual generators in that it allocates individual time slots. Furthermore, decentralized access mechanisms may be provided, for example, CSMA/CD, which provide a repetition of the transmission if the transmission was not performed completely undisturbed (i.e., collision-free). In particular, a token bus protocol may be used, according to which the individual generators are arranged in a sequence and a data packet is transmitted according to this sequence from one generator to the following generator. In the case of a token ring, only the generator, which currently holds the token, transmits the token representing a semaphore which allocates the right of transmission. As an initialization, the first generator begins the sequence, upon which the data packet sent thereby allocates the right of transmission to the one which has last received the packet. According to one example, in the case of communication via token ring, the first generator begins with the transmission, all receiving the message of the first generator. This represents the initialization phase. This is followed by the next generator, which comes after the first generator in the sequence, the third, the fourth, etc., of the sequence successively receiving the right of transmission. Various source addresses provided in the sequence may thus be assigned to the generators, for example, beginning with the number zero or one, the address number increasing by one when the next electrical generator obtains the right of transmission. In this case, the message includes an identifier, which corresponds to the particular current source address, to which the current right of transmission is assigned, this identifier being increased by the number one during each transmission procedure, in order to address the subsequent generator in the sequence. The last generator is followed by the first generator again. The sequence may be provided using an upward or downward continuous numbering; therefore, an identifier is either incremented or decremented upon the transfer of the token.

In another specific embodiment, the network includes an arbiter, which allocates the right of transmission in each case to a generator, in that the generator is addressed by the central controller via a corresponding message. It is preferably provided that in the event of failure of this communication central controller, the system passes into a non-arbitrated mode, for example, CDMA/CD or token ring, to ensure that the individual generators may transmit their workload values to the other generators even without a communication central controller, which is provided by the arbiter.

According to another specific embodiment, an output power central controller, which provides a setpoint total output power, is provided on the network which connects the electrical generators. The setpoint output power is to be achieved by all generators of the group in total. Such a central controller which provides a setpoint total output power is provided by an energy management module or a similar higher-order module, for example, which ascertains a total power consumed by the vehicle electrical system, in order to calculate the setpoint total output power therefrom. The central controller, which provides a setpoint total output power, may monitor the voltage of the vehicle electrical system, for example, to increase the setpoint total output power if the vehicle electrical system voltage falls below a certain value, and to reduce the setpoint total output power if the vehicle electrical system voltage rises above a further value. The central controller may particularly monitor the vehicle electrical system voltage in order to regulate the setpoint total output power in such a way that the vehicle electrical system voltage remains consistently at a predefined value or within a setpoint voltage interval. The generators may include an addition unit, to add up the individual generator workload values of the other generators, in order to calculate a total generated power therefrom, and to compare this power to the setpoint total output power. According to the comparison, the generator controls its own workload itself. However, the generator workload values of all other generators are preferably detected by each individual generator, added together, and averaged, in order to thus control the workload of each individual generator according to the averaged value. A uniform allocation of the workloads of all generators is thus achieved even without a central controller, which provides a total output power.

In addition to the average value of the workload values of all other generators, a further operating value may also be provided for controlling the individual generators, for example, the vehicle electrical system voltage, the workload of the particular generator being increased above the average value of the workload values of the other generators in the case of falling vehicle electrical system voltage. The increase above the average value may be in such a way that the vehicle electrical system voltage is increased back to a standard value by the increase, or it may be in such a way that the vehicle electrical system voltage is not fully increased up to a rated value. However, since the individual generator which increases its workload beyond the average value therefore also increases the total average value for the other generators, the incompletely compensating increase of one generator results in an increase of the output power of the other generators, whereby the power balance of the vehicle electrical system is additionally equalized. According to the present invention, at least one of the group of electrical generators is oriented to the motor vehicle voltage and includes or receives a minimum vehicle electrical system voltage or a standard vehicle electrical system voltage, which is compared by the at least one generator to the current vehicle electrical system voltage, to increase its own workload value above the average of all workload values. The increase may include a fixed value or may be ascertained on the basis of the difference between a currently existing vehicle electrical system voltage and a predefined vehicle electrical system voltage (for example, the minimum vehicle electrical system voltage or the standard vehicle electrical system voltage).

According to the present invention, each individual generator, based on the generator workload values of the other generators or based on the average value of the generator workload values of the other generators, ascertains a setpoint individual output power applicable for this individual generator or a generator workload value applicable for this generator, according to which the generator operates. The setpoint output power to be set or the workload value of the generator to be set is thus set by the generator in such a way that at least one operating parameter of the individual generator is changed, for example, an exciter voltage of the generator or a duty cycle at which the exciting current is switched. Furthermore, the setpoint voltage of a voltage regulator of the generator may be set as the operating parameter, or the power transmission between stator winding and exciter winding of the generator may be set, in order to thus set the self-excitation mode of the generator.

The generator workload values of all generators of the group are combined to acquire a total workload value. The combination is preferably provided by forming an arithmetic average, a geometric average, a weighted average, or a linear combination of the workload values. The arithmetic average of the workload values is preferably formed. The workload values may fundamentally be provided as a proportional value in relation to a standard or maximum workload value or maximum power value or as an absolute workload value, which indicates the instantaneous actual output power or the setpoint output power of the individual generator. For example, the generator workload values may be provided as relative values and may specify values as whole numbers in the form of percentage values, or, according to the form of representation within the transmitted message, may cover a range specified by the form of representation, for example, values from 0-255, if the workload values (without redundancy data) occupy 8 bits. In addition to the generator workload value, one generator or each generator of the group of generators may transmit an absolute power standard value, which indicates the nominal power or maximum power predetermined by the design. An absolute value may be formed on the basis of this nominal power with the aid of the associated relative generator workload value. Furthermore, in the formation of the average, the absolute nominal power of the particular generator may be taken into consideration in that the average is specified as a weighted average, the individual workload values being weighted according to the associated nominal power values, upon which the weighted workload values are averaged. Furthermore, instead of a nominal power value, which indicates the absolute power of a generator as a maximum power or nominal power, a nominal power in relation to the total power may also be transmitted, the relative nominal power representing a value which relates the absolute nominal power to the sum of all absolute nominal powers of all generators of the group. These relative nominal powers (which relate to the total nominal power of all generators) may be used for the weighting if a weighted average of all (relative) workload values is formed.

As already noted, the generator workload value may be transmitted as a pulse-width-modulated signal or as a digital signal, preferably in binary form. The workload value may be transmitted in bit form having a fixed word length in parallel or serial via the network or may be transmitted as an analog signal via the network. The transmission is either controlled by a central arbiter unit or is controlled in a decentralized way in that a multiplexing method is used, which has a decentralized access protocol. For example, a protocol having random access or having orderly access is provided as the decentralized access protocol, for example, CDMA/CD (carrier sense multiple access with collision detection), which provides that a generator only begins to transmit if the transmission medium, i.e., the network, is not being used for transmission by other generators. Collisions are resolved in this case, which occur if two generators begin to transmit nearly simultaneously. The collision is resolved, for example, in that a generator whose message could not be completely sent off repeats the transmission, preferably after a period of time which is fixed, includes a variable constant, or which includes a random component or is completely random. Time multiplexing, frequency multiplexing, or fundamentally also code multiplexing methods come into consideration as the multiplexing method, a time multiplexing method preferably being used, in the case of which the use of the network is partitioned into (non-overlapping) time slots and each time slot is allocated to at most one generator. During a specific time slot, only one generator may transmit, the other generators not being able to transmit. Fundamentally, a frequency multiplexing method may also be used, in the case of which the frequency bands preferably do not overlap or overlap in a separable way. As is also the case in the time multiplexing method, a channel, via which one generator transmits, is separated from a further (logical) channel by the frequency multiplexing method. The allocation of the frequency bands or time slots may be provided by a central communication controller or may be provided in the individual generators or the controllers thereof, so that the communication controller or the disposition of the medium is provided in a decentralized way.

The generator workload values are preferably transmitted with a generator identifier, for example, together with an operating state value of the associated generator (for example, functioning or defective), together with the currently output power, a control specification, which represents a setpoint power, a communication semaphore, as is necessary for token ring communication, for example, or together with a communication command which controls the communication. The partitioning of the medium may thus be provided using the communication semaphore or using the communication command, the control specification also being able to be a control strategy which characterizes a proportion with which the associated generator is to compensate for a power supply gap, for example, or the speed at which a generator is to react to changes of the control specifications. In addition to a function message (ready or defective), the operating state value may also represent a temperature of the associated generator, in order to prevent heating of a single generator, for example, while other generators operate at lower temperatures. Furthermore, the operating state value may also include the operating state of further components of the generator, for example, the working state (defective or working) of a rectifier circuit or a control circuit of the generator, or also the temperature of the control or rectifier circuit. The operating state value may further indicate an effective exciting current of the individual generator or a duty cycle of the exciting current of the generator. In particular, the operating state value may indicate a defect state, which indicates that the affected generator is not delivering any power. Furthermore, more global values may be transmitted with the data, for example, a setpoint total output power, which indicates the desired power total, which is delivered by an energy management circuit, for example, or an actual total output power, which is detected by a current sensor/voltage sensor within the vehicle electrical system, for example.

The generator workload values may optionally be transmitted with the above-mentioned data directly between the generators or may initially be output to a central memory within the network, which stores the values, in particular the generator workload values, together with generator identifications and keeps them retrievable for all generators (at least for the other generators). Preferably, all data associated with one generator are transmitted within a data packet in digital form, preferably protected by adding redundancy, or also in redundancy-free form.

In addition to a method according to the present invention, the present invention is also implemented by a decentralized control unit, which is connectable to an electrical generator and may be situated thereon, in order to activate this individual electrical generator. The decentralized control unit includes an input/output interface for communication with another input/output interface, which is associated with a further decentralized control unit, which may be connected to another generator of the group of generators. The input/output interface is preferably activated by a receiving unit and a transmitting unit of the decentralized control unit and is configured to communicate according to the above-mentioned method. Therefore, the transmitting unit provides transmitting generator workload values of the associated generator into the network and therefore to other generators directly or indirectly, in addition to the generator workload value, other associated data, preferably the generator identifier, also being transmitted. The receiving unit is configured to receive such data and in particular the generator workload values of other generators.

The present invention is therefore implemented via an electrical generator which includes a decentralized control unit, which includes the above-mentioned input/output interface and the associated receiving unit and the transmitting unit. The electrical generator is connected to the decentralized control unit in such a way that it activates the output power of the electrical generator. As a result, the decentralized control unit is configured in such a way that it may be connected to an electrical generator in order to control its output power. To process data which arrive from other decentralized control units, the central control unit preferably also includes an averaging device, using which the transmitted generator workload values may be combined as described above, i.e., with the aid of arithmetic averaging or with the aid of weighted averaging.

According to a further specific embodiment, the present invention is implemented using a total power specification unit, which may be connected to the network, in order to feed a total power of all generators to be generated into the network, for example, to be received by the individual generators of the group or to be stored in a central memory, from which the individual generators may retrieve the value of the total power. In a further specific embodiment, the central memory from which the value of the total power may be retrieved is provided in the total power specification unit. The total power specification unit must therefore only fulfill simple tasks such as the storage of a value or the transmission of a value to a memory, so that due to the low complexity, the probability of capacity utilization is significantly reduced compared to a central controller of the generators according to the related art, for example. The control itself is still provided by the individual generators, which orient themselves to the value of the total power which is specified by the total power specification unit. The decentralized control according to the present invention is thus ensured, the total power specification unit specifying the single common component, i.e., the value of the desired total power. Therefore, the individual generators or the associated decentralized control units may be constructed more simply, since they do not have to combine the individual workload values of the generators of the group. In this embodiment, the generator workload value is preferably transmitted by each generator to the total power specification unit, so that the total power specification unit is capable of combining all individual workload values of the generators, for example, by averaging.

The method according to the present invention and the devices according to the present invention allow an individual control, which is provided in each individual generator of the group of generators. The control is thus provided in a decentralized way; no component receives such a central position that the operation of the other generators would be impaired by its failure. Preferably, an error status of the generators is also transmitted with the individual workload values of the generators, so that if an error of one generator is ascertained, the other generators presume that it does not provide any power, so that the total power results from the sum of all functioning generators. A defective generator is therefore removed from the averaging.

At least two of the following generators come into consideration as the generators which supply a motor vehicle electrical system: dynamo, starter generator, recuperation generator, and others.

BRIEF DESCRIPTION OF THE DRAWING

FIG. 1 shows a schematic diagram to explain the method according to the present invention.

DETAILED DESCRIPTION OF THE INVENTION

FIG. 1 shows a schematic system overview, which is used to explain the method according to the present invention. Via a vehicle electrical system 10, a load 20 connected thereto is supplied with electrical power, cf. power flow direction A, the vehicle electrical system being supplied by three generators 30, 32, and 34. The power flow of the generators is shown by arrows B, B', and B". A first network, using which generators 30-34 are provided connected to one another, is shown by dashed lines. The dashed communication connection shows a token ring, in which first generator 30, which carries identification number 1, for example, sends a token together with data about the workload of generator 30 to generator 32. Before sending off the data packet, the identifier within the data packet is increased by 1, so that the data packet now contains generator identifier 2. The data are sent via the network shown using dashed lines to all generators 30-34, only generator 32, which has identifier 2, being authorized by the data packet to transmit. The authorization results because the data packet has the same identifier as the identifier of generator 32. This generator transmits its own workload as the workload value via network 40, which is shown by dashed lines, to generator 34, after generator 32 has taken over the identifier from the packet, which was sent off by generator 30, and has incremented the identifier by 1 (or by a fixed value in general). Since the packet sent off by generator 32 again contains the workload value (of generator 32) and the identifier increased by 1, all generators, in particular other generators 30 and 34, receive not only the workload value of generator 32, but rather also the identifier of the generator which is next authorized to transmit. Because of the increase of the identifier by generator 32, generator 34 is now addressed, whose identifier is 3 and therefore receives the authorization to transmit. Generator 34 transmits its workload value within a data packet into the network, so that generators 30 and 32 receive this packet. The identifier is reset by generator 34, since it has the highest identifier of all generators so that now (inter alia) generator 30 receives a data packet which has its identifier. Therefore, generator 30 is again authorized to transmit, and transmits its workload value together with the identifier increased by 1 to all generators, the authorization to transmit now being at generator 32 due to the identifier which was increased by generator 30. In the case of each transfer from one generator to the next generator, the workload value is sent to all other generators. The right to transmit is simultaneously relayed to the next generator, in that the identifier is increased before sending the data packet.

It is obvious that the identifier may also be provided as counting down, instead of an increase of the value, it being decreased by 1 and the generator having the smallest identifier setting the identifier within the data packet, using which the workload value is sent to the identifier of the first generator in the sequence, i.e., to the highest identifier of all generators within the group.

A further conceivable (alternative) network architecture is shown by dotted lines, i.e., in the form of a linear bus which connects generators 30, 34, and 32 to one another. All generators transmit and receive on the same bus 42. Bus 42 is an alternative to the network structure identified by reference numeral 40. Generators 30, 32, and 34 listen to the network and wait for a transmission break of all other generators. When the network, i.e., bus 42 is free, one of the generators transmits its workload value, which is received by all other generators. Therefore, if generator 30 transmits, generators 32 and 34 receive the workload value. The workload values are preferably regularly sent by the generator, workload values being prevented from being lost when generators transmit at overlapping times in bus 42. Therefore, if generator 30 and generator 34 transmit their workload value into the bus simultaneously or overlapping in time, the correct sending of the workload value (for example, as a data packet) is preferably monitored by both generators, and the transmission is repeated by all generators which establish an interference during the sending of their own workload value. Preferably, the generators repeat the transmission after different periods of time in the event of a detected collision, to prevent a continuously repeating collision. The duration may thus be provided differently, for example, it may be a function of an individual identifier of the generators (identifier 1→1 second waiting time, identifier 15→15 seconds waiting time or, as a further example: waiting time c1·identifier+c2). The network shown by reference numeral 42 is therefore controlled in a decentralized way and does not require a central communication unit.

An embodiment of the present invention which includes a central communication unit is shown by reference numeral 50. It cooperates with a network which runs as shown by reference numeral 42. Communication unit 50 controls the communication of generators 30-34 among one another, in that it transmits an identifier via bus 42, for example, in the form of a communication command, using which the individual generators are individually addressed, and outputs their workload value into bus 42, so that it is received by generators 32 and 34. Communication unit 50 therefore activates the individual generators in order to cause them to transmit their own workload values to the other generators. Communication unit 50 simultaneously ensures that the generators output their data into the bus in an orderly way, whereby a collision is prevented. Alternatively, communication unit 50 may also be provided with a memory, which receives the workload values of the individual generators and buffers them, communication unit 50 controlling the retrieval of the individual workload values from the memory by outputting individual commands to the generators. Furthermore, communication unit 50 may be provided with an averaging unit, which adds and averages (optionally with weighting) the received individual workload values, communication unit 50 being configured to transmit the averaged total value into network 42 and therefore to all generators 30-34. Central communication unit 50 may therefore not only have the functions of a central communication controller, but rather also the functions of a total power specification unit, which collects the individual workload values and provides a total power to be generated on the basis of the received values and transmits it to generators 30-34. Generators 30-34 form the group of at least two electrical generators which have a relation to one another in order to jointly provide an equalized power generation. The total setpoint power to be generated may be provided by an energy management system (not shown), for example, which detects the power sink represented by load 20.

What is claimed is:

1. A method for controlling a group of at least two electrical generators configured to supply power to a motor vehicle electrical system, comprising:
controlling each individual generator of the group to provide a generator workload value indicating the workload of the individual generator to each other one of the group of generators, wherein the generator workload value represents one of (i) an absolute value indicating an actual power generated by the individual generator, or (ii) a relative value indicating a ratio of the actual power generated by the individual generator to a nominal power of the individual generator.

2. The method as recited in claim 1, wherein each individual generator of the group, based on the generator workload values of the other generators of the group, ascertains a respective setpoint individual output power for the respective individual generator, and wherein at least one operating parameter of the respective individual generator is set by the respective individual generator using the respective setpoint individual output power.

3. The method as recited in claim 1, wherein:
a central controller provides a setpoint total output power to be achieved together by all generators of the group;
each individual generator of the group, based on the generator workload values of the other generators of the group and based on the setpoint total output power, ascertains a respective setpoint individual output power for the respective individual generator; and
at least one operating parameter of the respective individual generator is set by the respective individual generator using the respective setpoint individual output power.

4. The method as recited in claim 1, wherein each individual generator of the group uses the generator workload values of the other generators of the group to form a resulting average including one of an arithmetic average of the generator workload values, a geometric average of the generator workload values, a weighted average of the generator workload values, or an average as a linear combination of the generator workload values, and ascertains a setpoint individual output power for the respective individual generator from the resulting average, and wherein at least one operating parameter of the respective individual generator is set by the respective individual generator by using the respective setpoint individual output power.

5. The method as recited in claim 1, wherein:
each individual generator of the group transmits the respective generator workload value via a common network of the generators of the group as one of a pulse-width-modulated signal, a burst pulse-width-modulated signal, a digital signal, a parallel-binary value, a serial-binary value, or an analog signal;
the common network includes one of a serial or parallel bus;
the transmission of the generator workload values within the common network is on of (i) controlled by a central arbiter unit, or (ii) provided via a multiplexing method and a decentralized access protocol; and
the generator workload values are one of transmitted individually in the common network, without overlapping in time, or transmitted in the common network in different frequency bands, which do not overlap.

6. The method as recited in claim 1, wherein:
each generator workload value is transmitted via a common network of the generators of the group, together with at least one of a generator identifier, an operating state value of the respective generator, a control specification, a communication semaphore, and a communication command;
the control specification characterizes one of a control strategy, an actual power of the respective generator, or a setpoint power of the respective generator;
the operating state value of the respective generator characterizes at least one of a temperature of the respective generator, a temperature of a control circuit of the respective generator, a temperature of a rectifier circuit of the respective generator, an effective exciting current of the respective generator, a duty cycle of the exciting current, a defect state of the respective generator, a setpoint total output power of all generators of the group, and an actual total output power of all generators of the group.

7. The method as recited in claim 1, wherein the generator workload values are provided by one of (i) transmitting the generator workload values to a central memory accessible by all generators of the group, or (ii) transmitting the generator workload values from each individual generator to each other generator of the group via a data bus in the form of one of redundancy-free digital data or redundancy-protected digital data.

8. A decentralized control unit configured to activate an associated first individual electrical generator of a motor vehicle electrical system and situated on the associated first individual electrical generator, comprising:
an input/output interface configured to communicate with an input/output interface of at least one further decentralized control unit;
a receiving unit configured to receive a generator workload value transmitted via the input/output interface of the at least one further decentralized control unit; and
a transmitting unit configured to transmit a generator workload value indicating the workload of the associated first individual generator to a receiving unit of the at least one further decentralized control unit.

9. A total power specification unit configured to specify a total power to be generated by a group of electrical generators to supply a motor vehicle electrical system, comprising:
a common communication network connecting all electrical generators of the group;
a central memory connected to the common communication network and configured to store a value of the total power to be generated;
an output terminal connected to one of (i) the central memory via the common communication network to transmit the value of the total power to the central memory of the network, or (ii) the individual electrical generators of the group via the common communication network to transmit the value of the total power to each electrical generator of the group.

10. The unit as recited in claim 9, wherein each individual generator of the group, based on the generator workload values of the other generators of the group, ascertains a respective setpoint individual output power for the respective individual generator, and wherein at least one operating parameter of the respective individual generator is set by the respective individual generator using the respective setpoint individual output power.

11. The unit as recited in claim 9, wherein:
a central controller provides a setpoint total output power to be achieved together by all generators of the group;
each individual generator of the group, based on the generator workload values of the other generators of the group and based on the setpoint total output power, ascertains a respective setpoint individual output power for the respective individual generator; and at least one operating parameter of the respective individual generator is set by the respective individual generator using the respective setpoint individual output power.

12. The unit as recited in claim 9, wherein each individual generator of the group uses the generator workload values of the other generators of the group to form a resulting average including one of an arithmetic average of the generator workload values, a geometric average of the generator workload values, a weighted average of the generator workload values, or an average as a linear combination of the generator workload values, and ascertains a setpoint individual output power for the respective individual generator from the resulting average, and wherein at least one operating parameter of the respective individual generator is set by the respective individual generator by using the respective setpoint individual output power.

13. The unit as recited in claim 9, wherein:

each individual generator of the group transmits the respective generator workload value via a common network of the generators of the group as one of a pulse-width-modulated signal, a burst pulse-width-modulated signal, a digital signal, a parallel-binary value, a serial-binary value, or an analog signal;

the common network includes one of a serial or parallel bus;

the transmission of the generator workload values within the common network is on of (i) controlled by a central arbiter unit, or (ii) provided via a multiplexing method and a decentralized access protocol; and the generator workload values are one of transmitted individually in the common network, without overlapping in time, or transmitted in the common network in different frequency bands, which do not overlap.

14. The unit as recited in claim 9, wherein:

each generator workload value is transmitted via a common network of the generators of the group, together with at least one of a generator identifier, an operating state value of the respective generator, a control specification, a communication semaphore, and a communication command;

the control specification characterizes one of a control strategy, an actual power of the respective generator, or a setpoint power of the respective generator;

the operating state value of the respective generator characterizes at least one of a temperature of the respective generator, a temperature of a control circuit of the respective generator, a temperature of a rectifier circuit of the respective generator, an effective exciting current of the respective generator, a duty cycle of the exciting current, a defect state of the respective generator, a setpoint total output power of all generators of the group, and an actual total output power of all generators of the group.

15. The unit as recited in claim 9, wherein the generator workload values are provided by one of (i) transmitting the generator workload values to a central memory accessible by all generators of the group, or (ii) transmitting the generator workload values from each individual generator to each other generator of the group via a data bus in the form of one of redundancy-free digital data or redundancy-protected digital data.

16. The unit as recited in claim 9, wherein a central controller provides a setpoint total output power to be achieved together by all generators of the group, wherein each individual generator of the group, based on the generator workload values of the other generators of the group and based on the setpoint total output power, ascertains a respective setpoint individual output power for the respective individual generator, wherein at least one operating parameter of the respective individual generator is set by the respective individual generator using the respective setpoint individual output power, wherein each individual generator of the group uses the generator workload values of the other generators of the group to form a resulting average including one of an arithmetic average of the generator workload values, a geometric average of the generator workload values, a weighted average of the generator workload values, or an average as a linear combination of the generator workload values, and ascertains a setpoint individual output power for the respective individual generator from the resulting average, and wherein at least one operating parameter of the respective individual generator is set by the respective individual generator by using the respective setpoint individual output power.

17. The unit as recited in claim 16, wherein:

each individual generator of the group transmits the respective generator workload value via a common network of the generators of the group as one of a pulse-width-modulated signal, a burst pulse-width-modulated signal, a digital signal, a parallel-binary value, a serial-binary value, or an analog signal;

the common network includes one of a serial or parallel bus;

the transmission of the generator workload values within the common network is on of (i) controlled by a central arbiter unit, or (ii) provided via a multiplexing method and a decentralized access protocol; and the generator workload values are one of transmitted individually in the common network, without overlapping in time, or transmitted in the common network in different frequency bands, which do not overlap.

18. The unit as recited in claim 16, wherein:

each generator workload value is transmitted via a common network of the generators of the group, together with at least one of a generator identifier, an operating state value of the respective generator, a control specification, a communication semaphore, and a communication command;

the control specification characterizes one of a control strategy, an actual power of the respective generator, or a setpoint power of the respective generator;

the operating state value of the respective generator characterizes at least one of a temperature of the respective generator, a temperature of a control circuit of the respective generator, a temperature of a rectifier circuit of the respective generator, an effective exciting current of the respective generator, a duty cycle of the exciting current, a defect state of the respective generator, a setpoint total output power of all generators of the group, and an actual total output power of all generators of the group.

19. The unit as recited in claim 16, wherein the generator workload values are provided by one of (i) transmitting the generator workload values to a central memory accessible by all generators of the group, or (ii) transmitting the generator workload values from each individual generator to each other generator of the group via a data bus in the form of one of redundancy-free digital data or redundancy-protected digital data.

* * * * *

UNITED STATES PATENT AND TRADEMARK OFFICE
CERTIFICATE OF CORRECTION

PATENT NO. : 8,710,696 B2  Page 1 of 1
APPLICATION NO. : 12/998507
DATED : April 29, 2014
INVENTOR(S) : Thomas Peuser It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 377 days.

Signed and Sealed this

Twenty-ninth Day of September, 2015

Michelle K. Lee
*Director of the United States Patent and Trademark Office*